Patented May 28, 1929.

1,715,083

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

METHOD OF REFINING ROSIN.

No Drawing. Application filed July 28, 1926, Serial No. 125,597. Renewed December 7, 1928.

My invention relates to a process of treating rosin, both wood rosin, which, while marketable, is of a low grade, and the lower grades of gum rosin, so as to remove therefrom practically all of the objectionable coloring matter and product a high grade rosin adapted for use in sizing the higher grades of paper and in the manufacture of the better grades of varnish and which is so thoroughly purified and refined that it is adapted for use in the manufacture of high grade rosin soaps and limed varnishes of satisfactory color, as well as for most, if not all, other purposes to which the high grade gum rosin is adapted.

The rosin to be purified by my process may be produced as such from either wood or gum rosins by any of the usual and well known processes, or it may be purified as found in "drop liquor", which, as is well known, is produced by flooding wood stock, from which turpentine has been removed by steam, with gasoline, and which contains chiefly rosin, pine oil and various coloring bodies.

In carrying out the process embodying my invention, the rosin, especially wood rosin, may be subjected to any desired preliminary distillation process, or the rosin may be distilled after subjecting it to my refining process, but such is not necessary and is preferably omitted.

Now in accordance with my invention the rosin to be purified, in solution in a suitable solvent, for example, gasoline or other light petroleum distillate is treated with aniline ($C_6H_5NH_2$) for the extraction of color bodies therefrom, it having been discovered by me that aniline has the capacity for selectively extracting or dissolving color bodies from rosin.

In general the specific treatment of the rosin may be similar to that described in the application for United States Letters Patent filed by Harry E. Kaiser and Roy S. Hancock, Serial No. 92,890, filed March 6, 1926, and Serial No. 105,022, filed April 27, 1926, wherein a process for the purification of rosins by the use of furfural ($C_5H_4O_2$) is set forth in detail.

Typical of the practice of my invention using aniline, ($C_6H_5NH_2$), as the purifying agent, the following treatment of wood rosin will be illustrative:—

Wood rosin, produced by any of the known processes, is dissolved in a suitable solvent, for example, gasoline or other suitable solvent, to form a rosin solution containing say about 15% by weight of rosin to which is added aniline. For example, to say 1000 cc. of gasoline rosin solution containing 15% rosin, there is added 125 cc. of aniline and the gasoline-rosin solution and aniline thoroughly mixed.

The rosin solution and aniline should be thoroughly mixed and, if desirable, may be heated to form a homogeneous solution, though it will be understood that heating is not essential.

The mixture of gasoline-rosin solution and aniline, after thorough mixing is allowed to settle into layers, the lower one of which is primarily aniline and extracted color bodies, with a small proportion of the rosin, since the aniline has some solvent power on the rosin, and the upper one of which is primarily gasoline and rosin, from which the color bodies have been extracted by the aniline, with a small amount of aniline. The aniline is soluble in the gasoline-rosin solution at certain temperatures, its solubility decreasing with reduction of temperature below normal atmospheric temperatures, therefore, separation may be facilitated and made more complete by effecting the separation into layers at a reduced temperature, say a temperature of about 0°C.

The lower layer comprising primarily aniline with color bodies and the upper layer comprising primarily gasoline-rosin solution are separated by any convenient method, as by gravity or the use of centrifugal force. The gasoline-rosin solution will contain a small amount of aniline, since the aniline is to some extent soluble in the gasoline-rosin solution at the suggested temperature of about 0°C. The dissolved aniline may be removed from the gasoline-rosin solution by washing with an acid solution, for example, a 1% sulphuric acid solution, with which the aniline, a base, will combine, or it may be recovered with the gasoline, which as will appear, is distilled off for the recovery of the purified rosin. The purified rosin is recovered by distilling off the gasoline. The gasoline may be recovered by condensation for reuse. The yield of purified rosin will be found to be about 78% of the original, will grade G in color and will give a soap which will show only a slight amount of discoloration on aging.

The aniline has some solvent power on rosin, hence the separated aniline contains some rosin, as has been indicated, which may be recovered as refined rosin, for example, by extracting with gasoline, or it may be recovered as low grade rosin by distilling off the aniline and refined by redissolving in gasoline and extraction with aniline.

As a further illustration of the carrying out of the process involving my invention, for example, to 1000 cc. of gasoline-rosin solution, containing about 15% rosin, there is added 250 cc. of aniline, the mixture thoroughly agitated and then allowed to separate, the temperature of the mixture having been reduced to say a temperature of $-8°$ C. The recovery of refined rosin will amount to about 55%, grading I in color and affording a soap showing practically no discoloration on aging.

In the carrying out of my process, it will be understood that the amount of aniline used for the refining of any given amount of rosin may be used as a single wash or divided and used as a plurality of washes.

In carrying out the process according to my invention the aniline may, if desired, be caused to go into solution in the rosin solvent and a homogeneous solution of rosin, solvent and aniline formed, it being only necessary to have the mixture of rosin, solvent and aniline at a temperature at which the aniline will dissolve in the rosin and solvent, separation of the aniline and color bodies from the rosin solution being subsequently effected by a reduction of the temperature of the solution to a point where the major portion of the aniline will be insoluble in the rosin solvent and hence will be thrown out of solution along with the color bodies and a small proportion of the rosin.

The preferred solvent for the rosin is the gasoline cut of petroleum, but it will be understood that any suitable solvent, for example, any light petroleum distillate may be used, and it is my intention that where in the claims appended hereto gasoline is specified, the use, as the solvent for the rosin, of any operative equivalent for gasoline which is substantially immiscible with aniline shall be included as an equivalent of gasoline.

The process embodying my invention may be applied to the refining or purifying of low grade gum rosins for the production of high grade gum rosins and may likewise be applied to the refining of the rosin contained in "drop liquor", especially where the concentration of rosin in the drop liquor is not too high, the best results being obtainable where the concentration of rosin is not over 8%.

Having now fully described my invention, what I claim and desire to protect by Letters Patent is:—

1. In the method of refining rosin the step which includes subjecting rosin to treatment with aniline for the removal of color bodies from the rosin.

2. In the method of refining rosin the step which includes subjecting rosin in solution to treatment with aniline for the removal of color bodies from the rosin.

3. The method of refining rosin, which includes dissolving rosin in a solvent normally substantially immiscible with aniline, treating the rosin solution with aniline for the extraction of color bodies from the rosin, separating aniline and color bodies from the rosin solution and recovering refined rosin from the rosin solution.

4. The method of refining rosin, which includes dissolving rosin in a solvent normally substantially immiscible with aniline, treating the rosin solution with aniline for the extraction of color bodies from the rosin, reducing the temperature of the rosin solution, separating aniline and color bodies from the rosin solution and recovering refined rosin from the rosin solution.

5. The method of refining rosin, which includes dissolving rosin in gasoline, treating the gasoline-rosin solution with aniline for the extraction of color bodies from the rosin, separating aniline and color bodies from the gasoline-rosin solution and recovering refined rosin from the gasoline-rosin solution.

6. The method of refining rosin, which includes dissolving rosin in gasoline, treating the gasoline-rosin solution with aniline for the extraction of color bodies from the rosin, reducing the temperature of the rosin solution, separating aniline and color bodies from the gasoline-rosin solution and recovering refined rosin from the gasoline-rosin solution.

7. The method of refining rosin, which includes dissolving rosin in a solvent normally substantially immiscible with aniline, adding aniline to the solution for the extraction of color bodies from the rosin, heating the solution to a temperature at which aniline will go into solution in the rosin solution, cooling the solution formed to a temperature at which aniline and extracted color bodies will separate from the rosin solution, separating aniline and color bodies from the rosin solution and recovering refined rosin from the rosin solution.

8. The method of refining rosin, which includes dissolving rosin in gasoline, adding aniline to the gasoline-rosin solution for the extraction of color bodies from the rosin, heating the gasoline-rosin solution to a temperature at which aniline will go into solution in the gasoline-rosin solution, cooling the solution formed to a temperature at at which aniline and extracted color bodies will separate from the gasoline-rosin solution, separating aniline and color bodies from the gasoline-rosin solution and recovering refined rosin from the gasoline-rosin solution.

9. The method of refining rosin, which includes dissolving rosin in gasoline, adding aniline to the gasoline-rosin solution for the extraction of color bodies from the rosin, heating the gasoline-rosin solution to a temperature at which aniline will go into solution in the gasoline-rosin solution, cooling the solution formed to a temperature within about the range 0° C.—8° C., separating aniline and color bodies from the gasoline-rosin solution and recovering refined rosin from the gasoline-rosin solution.

In testimony of which invention, I have hereunto set my hand, at Kenvil, N. J., on this 23rd day of July, 1926.

IRVIN W. HUMPHREY.